United States Patent Office 3,309,362
Patented Mar. 14, 1967

3,309,362
PREGNANE GUANYL HYDRAZONES AND DERIVATIVES THEREOF
Karlheinz Meyer and Siegismund Schütz, Wuppertal-Elberfeld, Kurt Stoepel, Wuppertal-Vohwinkel, and Hans-Günther Kroneberg, Haan, Rhineland, Germany, assignors to Farbenfabriken Bayer Aktiengesellschaft, Leverkusen, Germany, a corporation of Germany
No Drawing. Filed Feb. 17, 1965, Ser. No. 433,479
Claims priority, application Germany, Feb. 19, 1964, F 42,053
12 Claims. (Cl. 260—239.5)

Application Serial No. 337,739, now Patent 3,268,520, describes a process for the production of guanyl hydrazones of 20-carbonyl-steroids, wherein the term 20-carbonyl-steriods means pregnane compounds which contain the radical —OD in the 3-position, D denoting hydrogen, acyl or a basic radical.

It has now been found that new cardio-active, i.e. cardiotonic, compounds are obtained, when pregnane compounds which contain hydrogen, O-alkyl, O-cycloalkyl, O-aryl, halogen, alkyl, cycloalkyl, aryl, alkenyl, alkinyl, COOR wherein R is alkyl acyl, O-sulphonyl, O-phosphonyl, O-NO, O-NO$_2$, NO, NO$_2$, CN, SH, S-alkyl, S-cycloalkyl, =S, S-aryl, S-acyl, CONH$_2$, CS—NH$_2$, NH-acyl, NH—SO$_2$-alkyl, further oxime, hydrazone, semicarbazone, thiosemicarbazone, =N-alkyl, imino, urea, thiourea, urethane, thiourethane or non-basic guanyl hydrozone groups in the 3-position, which can be linked with the rings A,B- B,C- and C,D- in the cis- or trans-form; which can be saturated and unsaturated as well as nor-, homo- and cyclo- compounds; the structure of which can be substituted in the manner customary for the sterine series, and in which individual carbon atoms of the structure can be replaced by hetero atoms such as nitrogen, oxygen or sulphur atoms, are converted in a manner known per se into guanyl hydrazones.

Active compounds are also obtained by starting from pregnane compounds which contain the following heterocycles attached in the 2,3-position: pyrazole, isoxazole, thiazole, pyrrole, triazole and epoxy rings.

Suitable starting materials are, for example: 3-methoxy-pregn-5-ene-20-one, 3 - methoxy-pregna-3,5-diene-20-one, 3-ethoxy-pregn - 5 - ene-17$a$-ol-20-one, 3-ethoxy-pregna - 3,5 - diene-21-ol-20-one, 3-cyclohexoxy-pregna-3,5-diene-21-ol-20-one, pregna-3,5-diene-17$a$-ol-20-one, 3-chloro-pregn-5-ene-20-one, 3-chloro-pregn - 5 - ene-21-ol-20-one, 3-methyl-pregna - 3,5 - diene-20-one, 3-phenyl-pregna-3,5-diene-20-one, 3-methoxy - pregna-3,5-diene-6-methyl-20-one, 3 - ethoxy-9$\alpha$-fluoro-pregna-3,5-diene-11-ol-20-one, 3-methoxy-6-methyl-pregna-3,5-diene-17$\alpha$, 21-diol-20-one, 3,5-cyclo-pregnane-6$\beta$-ol-20-one, pregnane-20-one-3-carboxylic acid, 3-carbethoxy-pregna-3,5-diene-20-one, 3-ethinyl-pregna - 3,5 - diene - 20 - one, 3-cyano-pregna - 3,5 - diene - 20 - one, 3 - acylamino - pregnane-20-one, pregn-4-ene-20-one-3-oxime, pregn-4-ene-20-one-3-hydrazone, pregn-4-ene-20-one-3-semicarbazone, pregn-4-ene-20-one-3-thio-semicarbazone, 2,3 - epoxy-pregnane-20-one, pregnane-20-one-2,3-pyrazole, pregn-4-ene-20-one-2,3-pyrazole, pregnane-20-one-2,3-thiazole, pregn-4-ene-20-one - 2,3 - thiazole, pregnane-20-one-2,3-isoxazole, pregn-4-ene-20-one - 2,3 - isoxazole, pregnane-20-one-2,3-pyrrole, pregn-4-ene-20-one-2,3-pyrrole, pregnane-20-one-2,3-triazole, pregn-4-ene-20-one-2,3-triazole, etc.

According to the invention the new compounds are produced in such a manner that the said pregnane compounds are:

(a) reacted with aminoguanidine or its salts in known manner, or (b) condensed with thiosemicarbazide and the condensation products either reacted with ammonia or first converted in known manner into the S-alkyl-isothiosemicarbazones which are then reacted with ammonia, or (c) reacted with S-alkyl-isothiosemicarbazide or its salts and the products reacted with ammonia, or (d) condensed with hydrazine and subsequently reacted with cyanamide.

The compounds produced according to the invention can be used as such or in the form of their salts with pharmaceutically acceptable non-toxic organic and inorganic acids. Suitable acids are, for example, acetic acid, propionic acid, lactic acid, maleic acid, fumaric acid, succinic acid, tartaric acid, citric acid, salicyclic acid, naphthalene-1,5-disulphonic acid, phosphoric acid, hydrochloric acid, etc.

The invention is illustrated by the following non-limitative examples.

EXAMPLE I 400 milligrams of aminoguanidine hydrogen carbonate are dissolved in methanolic hydrochloric acid until the pH value is 2, and mixed with a solution of 1 g. of pregn-4-ene-20-one-[3,2-c]-N-carbamyl-pyrazole in 30 ml. of chloroform and 70 ml. of methanol. The solution is allowed to stand under nitrogen at room temperature for 3 days, then stirred into ether, the resultant precipitate is filtered off with suction, boiled several times with acetone and reprecipitated from alcohol/acetone.

Yield: 0.7 gram of the hydrochloride of pregn-4-ene-[3,2-c]-N-carbamyl-pyrazole - 20 - guanyl hydrazone of M.P. 270–272° C. (decomposition).

EXAMPLE II 200 milligrams of pregn-4-ene-20-one[3,2-c]-pyrazole are dissolved in 30 ml. of methanol, mixed with a solution (pH value 2) of 100 mg. of aminoguanidine hydrogen carbonate in methanolic hydrochloric acid and allowed to stand under nitrogen at room temperature for 3 days. The solution is then stirred into ether, the precipitate is filtered off with suction and boiled several times with acetone.

Yield: 0.2 gram of the hydrochloride of pregn-4-ene-[3,2-c]-pyrazole-20-guanyl hydrazone of M.P. 283–285° C. (decomposition).

EXAMPLE III

To 5 ml. of acetic anhydride there is added slowly under stirring 0.2 g. of 3-$\beta$-amino-pregnane-20-one and the mixture is warmed for 1 hour at 50° C. The mixture is then evaporated to dryness in a vacuum, the residue is dissolved in methanol and the solution is stirred into ice water. The precipitate is suction filtered and washed with water. After the drying, there are obtained 200 mg. of crude 3$\beta$-acetylamino-pregnane-20-one, which is dissolved in 5 ml. of ethanol and reacted with a solution of 85 mg. of aminoguanidine hydrogen carbonate in methanolic hydrochloric acid (pH value=2). This is allowed to stand for 3 days at room temperature under nitrogen, stirred into ether, decanted, the viscous residue is dissolved in water, filtered and the filtrate adjusted with dilute NaOH. The precipitated flakes are suction filtered, washed with water and dried. The dry substance is then dissolved in a little ethanol diluted with ether and reacted with ethereal hydrochloric acid until it has an even acid reaction. The precipitated salt is suction filtered and boiled out with ether.

Yield: 150 mg. of the hydrochloride of 3$\beta$-acetylamino-pregnane-20-guanyl hydrazone of M.P. 143° C. with decomposition.

EXAMPLE IV 200 mg. of 3$\beta$-amino-pregnane-20-one are dissolved in 3 ml. of anhydrous chloroform, 50 mg. of methylisothiocyanate are added thereto and boiled for 12 hours under reflux. The product is then evaporated to dryness under vacuum, the residue is dissolved in 5 ml. of methanol, the solution is stirred into ice water and the precipitate suction filtered. After the drying, there are obtained 200 mg. of N-methyl-N'-(pregnane-20-one-3β-yl) thiourea. This crude product is dissolved in 5 ml. of ethanol and there is added thereto a solution of 80 mg. of aminoguanidine hydrogen carbonate in methanolic hydrochloric acid (pH value=2) and allowed to stand 3 days under nitrogen at room temperature. The reaction solution is stirred into ether, the precipitate is suction filtered and washed with ether. The material is triturated with a little water, the remaining crystals are suction filtered and washed with ether.

Yield: 100 mg. of the hydrochloride of N-methyl-N'-(pregnane-20-guanyl hydrazone-3β-yl)-thiourea of M.P. 218°–220° C. with decomposition.

EXAMPLE V 110 mg. of 1-nitro-3-aminoguanidine is dissolved in methanolic hydrochloric acid until the pH value is 2 and there is added thereto a solution of 300 mg. of pregn-4-ene-3-one-20-guanyl hydrazone in 25 ml. of ethanol.

This is stirred for 3 days under nitrogen at room temperature, the crystals are suction filtered and washed first with alcohol and then with ether.

Yield: 0.3 g. of the hydrochloride of pregn-4-ene-3-(1'-nitro-guanyl hydrazone)-20-guanyl hydrazone of M.P. 211° C. with decomposition.

EXAMPLE VI

Similarly to Example V, there is obtained from pregn-4-ene-3-one-20-guanyl hydrazone and 1-(p-chlorophenylsulfo)-3-aminoguanidine the hydrochloride of pregn-4-ene-3-[1'-(1'-chlorophenylsulpho)-guanyl hydrazone]-20-guanyl hydrazone of M.P. 314° C. with decomposition.

EXAMPLE VII 0.5 g. of pregn-4-ene-3-one-20-guanyl hydrazone is dissolved in 25 ml. of ethanol, there is added thereto a solution of 160 mg. of thiosemicarbazide in 1.5 ml. of water and 0.3 ml. of concentrated hydrochloric acid and heated 30 minutes under reflux. The product is cooled, the crystals are suction filtered, boiled out with alcohol, again suction filtered and then washed with ether.

Yield: 0.3 g. of the hydrochloride of pregn-4-ene-3-thiosemicarbazone-20-guanyl hydrazone of M.P. 327° C. with decomposition.

EXAMPLE VIII 0.5 g. of pregn-4-ene-3-one-20-guanyl hydrazone are dissolved in 25 ml. of ethanol, reacted with 1 ml. of hydrazine hydrate and heated 2 hours under reflux. After cooling, there is added ethereal hydrochloric acid until the pH value is 2, the resulting precipitate is suction filtered and then washed with alcohol. For purification, it is cooked out with water, suction filtered and then washed with ether.

Yield: 0.3 g. of the hydrochloride of pregn-4-ene-3-hydrazone-20-guanyl hydrazone of M.P. 310° C. with decomposition.

EXAMPLE IX 0.5 g. of pregn-4-ene-3-one-20-guanyl hydrazone is dissolved in 25 ml. of ethanol, there is added thereto a solution of 0.5 g. of semicarbazide hydrochloride and 0.7 g. of sodium acetate in 3.5 ml. of water and heated 30 minutes under reflux. This is allowed to cool slowly, the precipitated crystals are suction filtered, boiled out with ethanol, again suction filtered and then washed with ether.

Yield: 0.4 g. of the hydrochloride of pregn-4-ene-3-semicarbazone-20-guanyl hydrazone of M.P. 302° C. with decomposition.

EXAMPLE X 0.5 g. of pregn-4-ene-3-one-20-guanyl hydrazone is dissolved in 25 ml. of alcohol, there is added thereto a solution of 190 mg. of hydroxylamine hydrochloride and 0.4 g. of sodium acetate in 2.5 ml. of water and heated for 3 hours under reflux. The product is evaporated to half its volume, is allowed to cool slowly, the precipitated crystals are suction filtered then washed with a little water and crystallized from methanol.

Yield: 0.2 g. of the hydrochloride of pregn-4-ene-3-oxime-20-guanyl hydrazone of M.P. 324–326° C. with decomposition.

EXAMPLE XI 3 g. of pregnenolone are dissolved in 30 ml. of absolute pyridine. There is added thereto dropwise at —23° C. a solution of 6 ml. of POCl₃ in 60 ml. of dry pyridine and stirred long enough until the temperature of the reaction mixture rises to —10° C. Then it is poured onto ice, the colorless precipitate is suction filtered and thereafter washed with a large quantity of ice water. The colorless substance is boiled out with acetone three times for analysis (M.P. 169–182° C.). 800 mg. of the resulting pregnenolone-3-phosphoric acid ester are dissolved in 130 ml. of absolute methanol and reacted with a solution of 250 mg. of aminoguanidine hydrochloride in 10 ml. of methanol, plus 2 drops of methanolic hydrochloric acid. After stirring for about 40 hours at room temperature, the solution is introduced dropwise into ether, the colorless precipitate is suction filtered and boiled out several times with acetone.

Yield: 0.5 g. of the hydrochloride of pregnenolone-3-phosphoric acid ester-20-guanyl hydrazone of M.P. 230–237° C.

What is claimed is:

1. A pregnane-20-guanyl hydrazone in which the 20 keto-pregnane compound prior to its conversion to the 20-guanyl hydrazone contains a member selected from the group consisting of hydrogen, O-alkyl, O-cycloalkyl, halogen, alkyl, cycloalkyl, aryl, alkinyl, COOR wherein R is H or alkyl, O-phosphonyl, CN, NH-acyl, oxime, hydrazone, semicarbazone, thiosemicarbazone, thiourea, and non-basic guanyl hydrazone in the 3-position, and which compound can be saturated and unsaturated as well as a 3,5-cyclo-compound, and such compound in which there is a heterocycle in the 2,3-position selected from the group consisting of pyrazole, isoxazole, thiazole, pyrrole, triazole and epoxy rings.

2. The compound pregn-4-ene-[3,2-c]-N-carbamyl-pyrazole-20-guanyl hydrazone.

3. The compound 3-pyrrolidino-3,5-pregnadiene-20-guanyl hydrazone.

4. The compound 3β-acetylamino-pregnan-20-guanyl hydrazone.

5. The compound N-methyl-N'-(pregnan-20-guanyl hydrazone-3β-yl)-thiourea.

6. The compound pregn-4-ene-3-(1'-nitro-guanyl hydrazone)-20-guanyl hydrazone.

7. The compound pregn-4-ene-3-[1'-(p-chlorophenylsulfo)-guanyl hydrazone]-20-guanyl hydrazone.

8. The compound pregn-4-ene-3-thiosemicarbazone-20-guanyl hydrazone.

9. The compound pregn-4-ene-3-hydrazone-20-guanyl hydrazone.

10. The compound pregn-4-ene-3-semicarbazone-20-guanyl hydrazone.

11. The compound pregn-4-ene-3-oxime-20-guanyl hydrazone.

12. The compound pregnenolone-3-phosphoric acid ester-20-guanyl hydrazone.

No references cited.

LEWIS GOTTS, *Primary Examiner.*

H. A. FRENCH, *Assistant Examiner.*